UNITED STATES PATENT OFFICE.

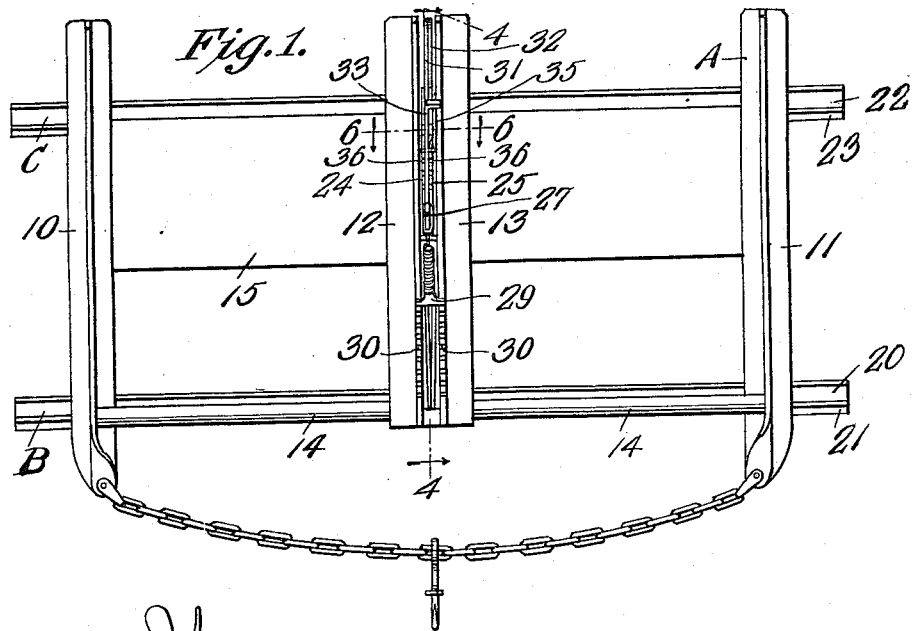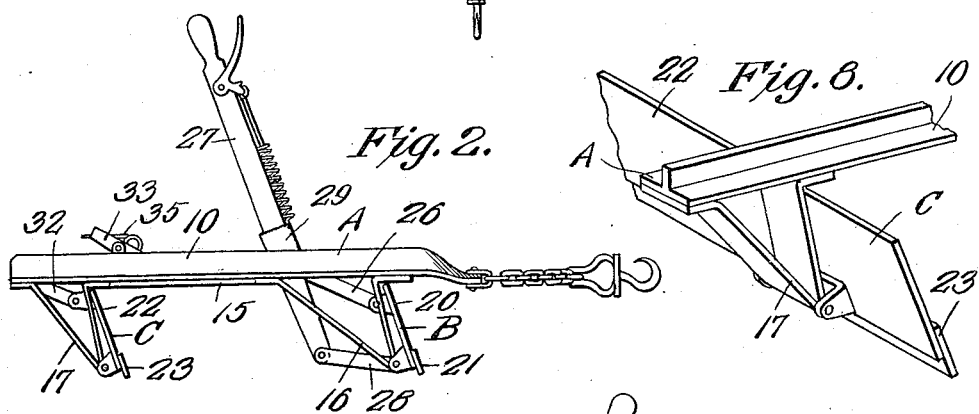

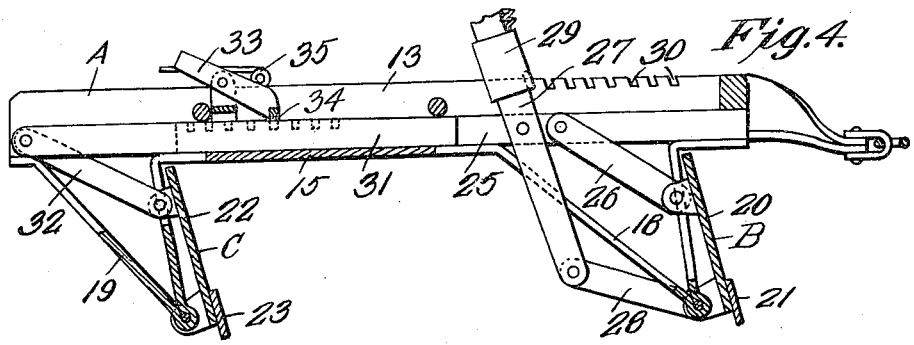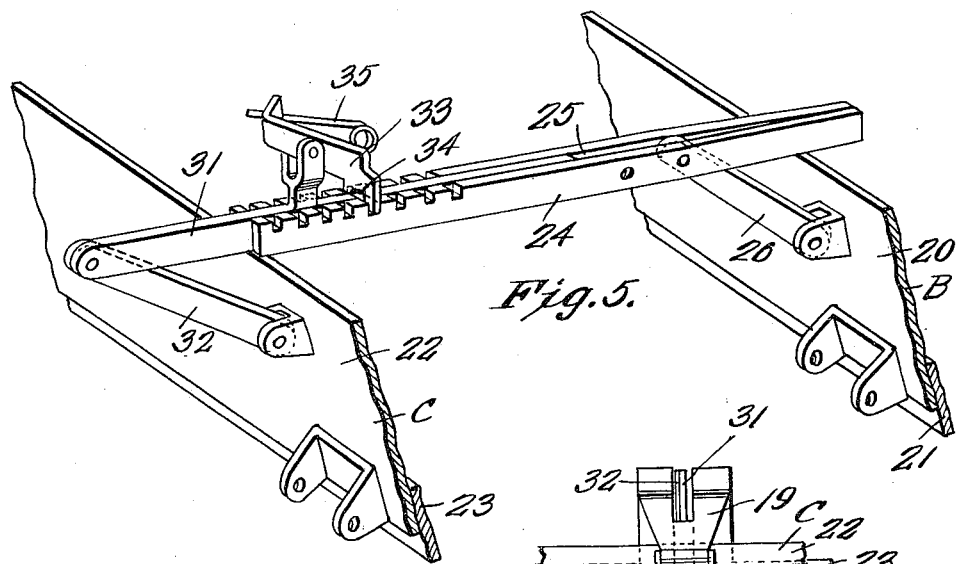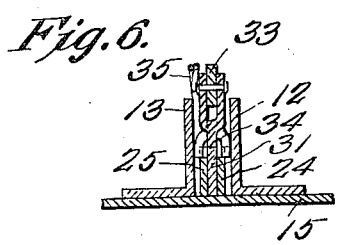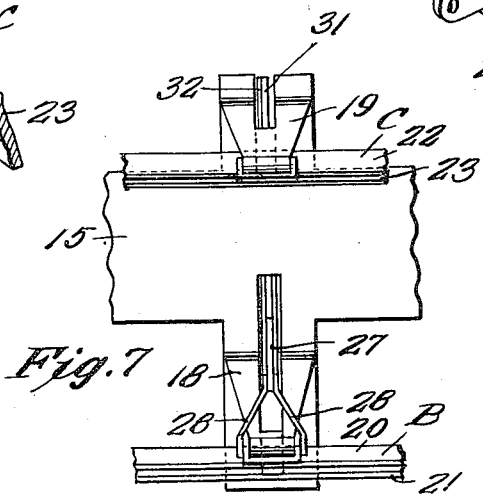

GEORGE A. POLLARD, OF STURGEON, MISSOURI.

ROAD-DRAG.

1,193,921.　　　　Specification of Letters Patent.　　Patented Aug. 8, 1916.

Application filed May 19, 1916. Serial No. 98,633.

*To all whom it may concern:*

Be it known that I, GEORGE A. POLLARD, a citizen of the United States, residing at Sturgeon, in the county of Boone, State of Missouri, have invented certain new and useful Improvements in Road-Drags; and I do hereby declare the following to be a full, clear, and exact description of the invention, such as will enable others skilled in the art to which it appertains to make and use the same.

This invention relates to road drags.

The object of the invention is to provide a road drag including front and rear hinged blades and improved means whereby said blades may be adjusted simultaneously through the medium of a single lever, or may be adjusted independently to different initial positions and then swung simultaneously on their hinges through the medium of the lever.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a road drag constructed in accordance with the invention; Fig. 2, a side view of the drag with the front and rear blades correspondingly adjusted with respect to the frame of the drive and ready to be actuated simultaneously through the medium of the operating lever; Fig. 3, a view similar to Fig. 2 with the front blade adjusted to a different initial position than that of the rear blade; Fig. 4, a section on the line 4—4 of Fig. 1; Fig. 5, a perspective view of the adjustable bars connected with the operating lever and with the blade links, the guide members of the drag frame being removed for the sake of clearness; Fig. 6, a section on the line 6—6 of Fig. 1; Fig. 7, a bottom view of a fragment of what is shown in Fig. 1, and Fig. 8, a perspective view of one of the hinge mountings of one of the blades.

Referring to the drawings the improved road drag is shown as comprising a frame A including longitudinal side members 10 and 11, intermediate longitudinal members 12 and 13, a front cross rod 14 and a rear cross member 15. Depending from the front and rear ends of the members 10 and 11 respectively are brackets 16 and 17, while corresponding brackets 18 and 19 depend from the front and rear ends respectively of the members 12 and 13. Hinged to the brackets 16 and 18 is a front cutter B including a body 20 and a cutter blade 21. It will be noted that the hinge connection between the cutter B and the brackets 16 and 18 is located at the lower edge of the body 20 so that the operating pressure beneath the hinge will be substantially balanced by the mass of earth resting against the cutter above the hinge. Hinged to the brackets 17 and 19 is a rear cutter C including a body 22 and a cutter blade 23. Likewise the hinge connection between the cutter C and the brackets 17 and 19 is located at the lower edge of the body 22 so that the operating pressure beneath the hinge will be substantially balanced by the mass of earth resting against the body above the hinge. As a result of this balanced construction of the cutters their simultaneous adjustment during the operation of the device through the medium of an operating lever is rendered relatively easy.

Slidably mounted between the members 12 and 13 are spaced bars 24 and 25 between which is pivotally mounted one end of a link 26, the other end of said link being pivotally connected to the body 20 adjacent the upper end of the latter. Also pivotally mounted between the bars 24 and 25 is an operating lever 27 the lower end of which is pivotally connected to a yoke 28 and the latter in turn pivotally associated with the hinge connection between the cutter B and the bracket 18. It will of course be understood that the bracket 18 is suitably slotted to provide the necessary clearance for the operation of the lever 27. The lever 27 carries a pawl 29 which coöperates with ratchet teeth 30 formed on the members 12 and 13 and whereby the lever is locked in a desired adjustment. Slidably mounted between the bars 24 and 25 is a bar 31 the outer end of which has pivotally connected thereto one end of a link 32, the other end of said link being pivotally connected to the body 22 adjacent the top of the latter. The bar 31 carries a foot pawl 33 which is suitably pivoted thereon and is normally held engaged in a notch 34 formed in said bar by means of a spring 35. The bars 24 and 25 are provided with corresponding teeth 36 and when the space between these teeth registers with the notch 34 the pawl 33 will engage between the teeth and in the notch 34 and lock the bar 31 to the bars 24 and 25 so that all of said bars will be moved in unison when the lever 27 is rocked.

When the bars 24, 25 and 31 are connected for movement in unison it will be obvious that movement of the lever 27 will produce a corresponding movement of the cutters B and C. In some cases it is desirable to have the cutters adjusted to substantially the same initial position with respect to the frame and in other cases it is desirable to have one of the cutters disposed at considerable angularity with respect to the frame in its initial position. Assuming the cutters to occupy the initial position shown in Fig. 2 and it is desired to adjust the front blade to the position shown in Fig. 3. To reach this end the operator will release the pawl 29 with his foot and then move the lever 27 forward. This movement of the lever will be without effect on the cutter C but will operate the cutter B to the position shown in Fig. 3. The pawl 29 is then released when further movement of the lever 27 will produce simultaneous movements of the cutters. If it is desired to change the initial angle of the cutter C with respect to the frame the lever 27 is operated to move the cutter to such angle. After this is done the pawl 29 is disengaged and the lever 27 operated to return the cutter B to its initial position and the pawl then released to lock the bars 24, 25 and 31 together.

What is claimed is:—

A road drag comprising a frame, a pair of cutters hingedly mounted on the frame, spaced bars slidable on the frame, a lever pivotally supported by the frame and secured to said bars, a link connecting said bars with one of the cutters, a third bar slidable between the spaced bars, means for detachably locking the third bar to the spaced bars in different adjustments, and a link connecting the third bar with the other cutter.

In testimony whereof, I affix my signature, in the presence of two witnesses.

GEORGE A. POLLARD.

Witnesses:
E. S. STEWART,
J. S. WEBSTER.